J. A. WILSON, Jr.
STEERING GEAR FOR VEHICLES.
APPLICATION FILED MAY 10, 1909.
939,180.
Patented Nov. 2, 1909.
4 SHEETS—SHEET 1.
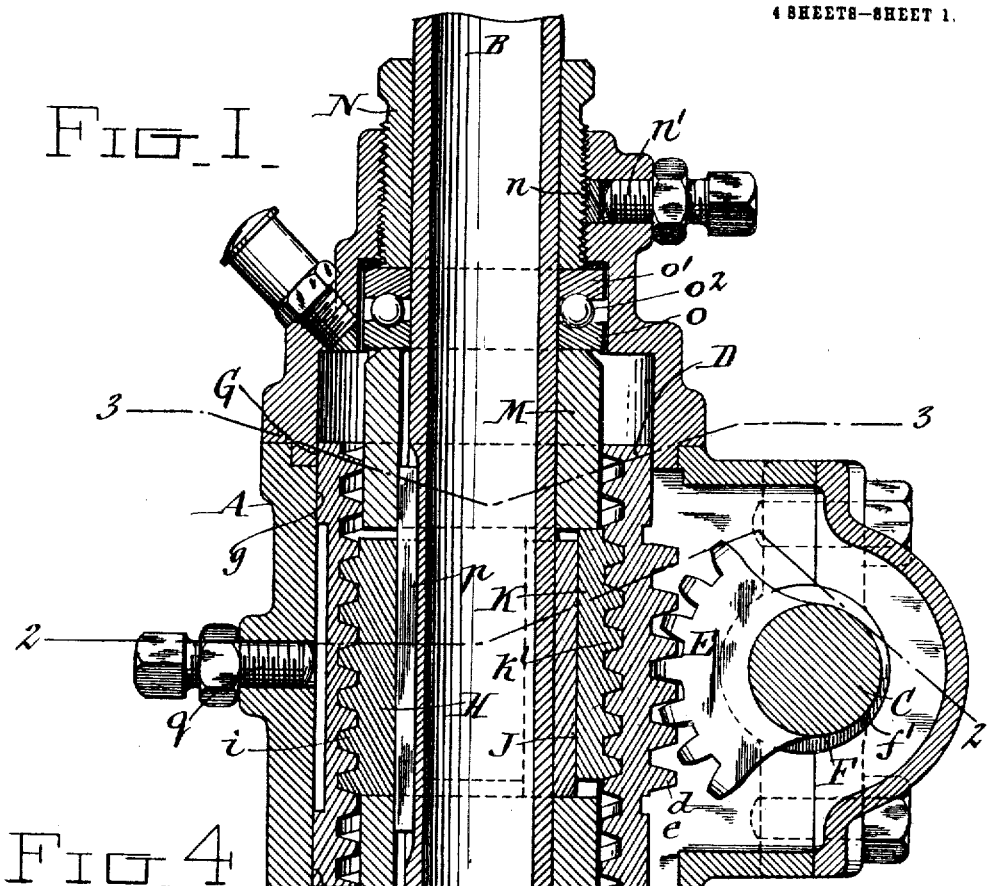
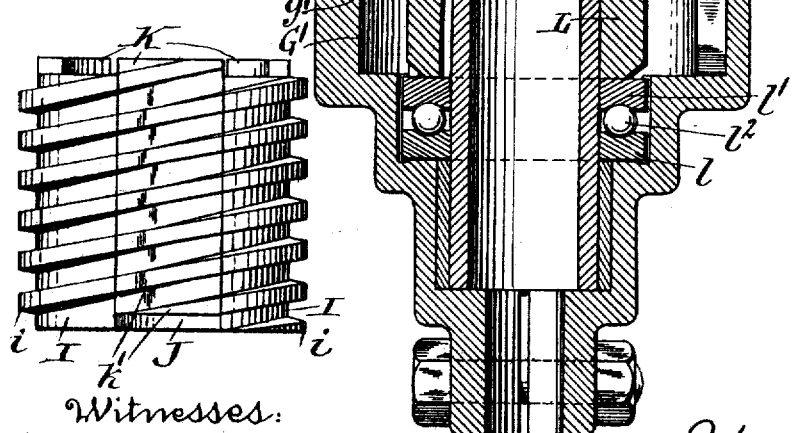
Witnesses:
J. Milton Jester
Richard Sommer
Inventor.
John A. Wilson Jr.
by Geyer & Popp
Attorneys.

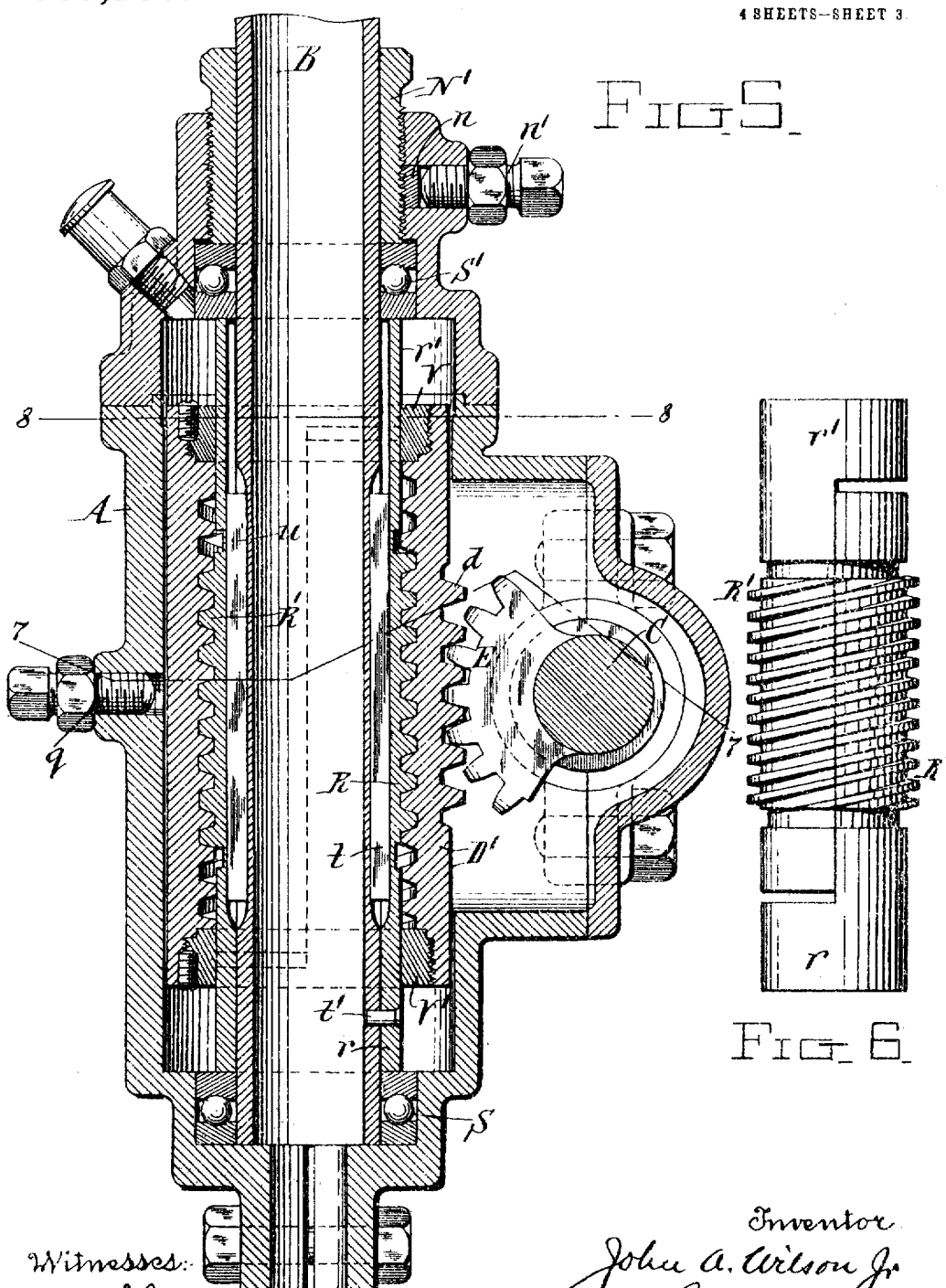

UNITED STATES PATENT OFFICE.

JOHN A. WILSON, JR., OF BUFFALO, NEW YORK, ASSIGNOR TO NOYE MANUFACTURING COMPANY, OF BUFFALO, NEW YORK, A CORPORATION OF NEW YORK.

STEERING-GEAR FOR VEHICLES.

939,180. Specification of Letters Patent. Patented Nov. 2, 1909.

Application filed May 10, 1909. Serial No. 495,101.

*To all whom it may concern:*

Be it known that I, JOHN A. WILSON, Jr., a citizen of the United States, and residing at Buffalo, in the county of Erie and State of New York, have invented a new and useful Improvement in Steering-Gear for Vehicles, of which the following is a specification.

This invention relates to that type of steering gears for automobiles or other vehicles in which the rotary movement of the mast or steering post is transmitted to the steering wheels by mechanism which comprises a worm or screw and a nut meshing with said worm.

It is the object to provide simple, efficient and comparatively inexpensive means, whereby the slack due to wear on the worm and nut may be readily and conveniently taken up, and also to provide simple means for determining whether any slack in the steering mechanism is present between the worm and nut or elsewhere.

Figure 2:
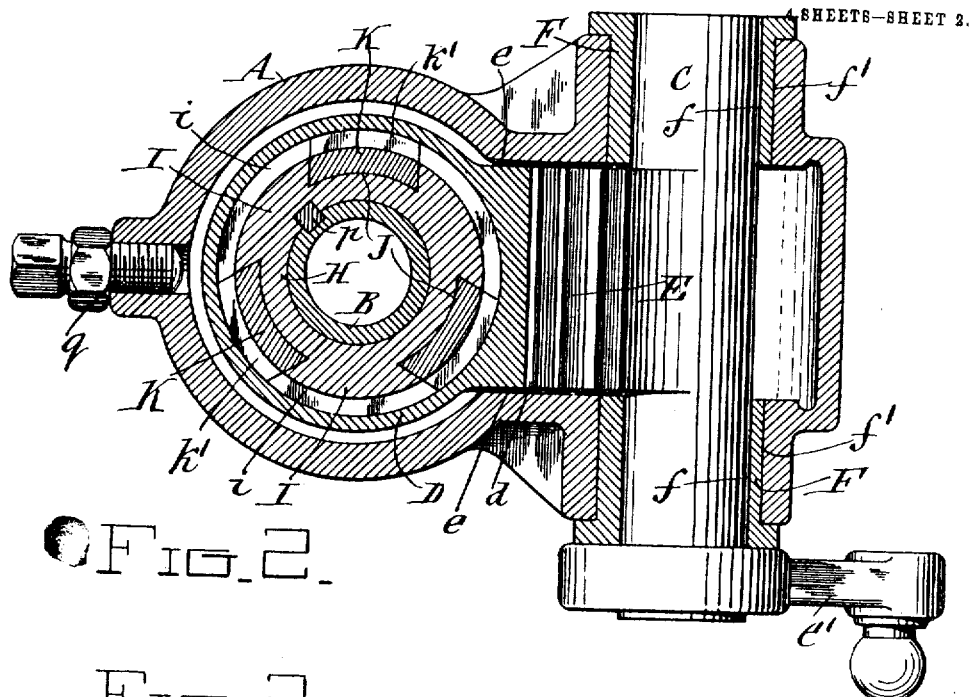
Figure 3:
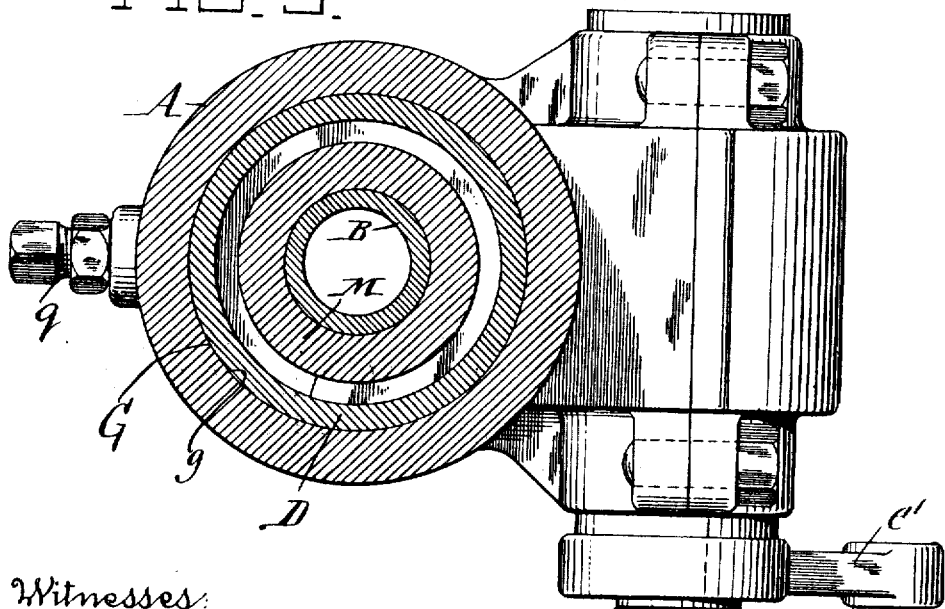
Figure 7:
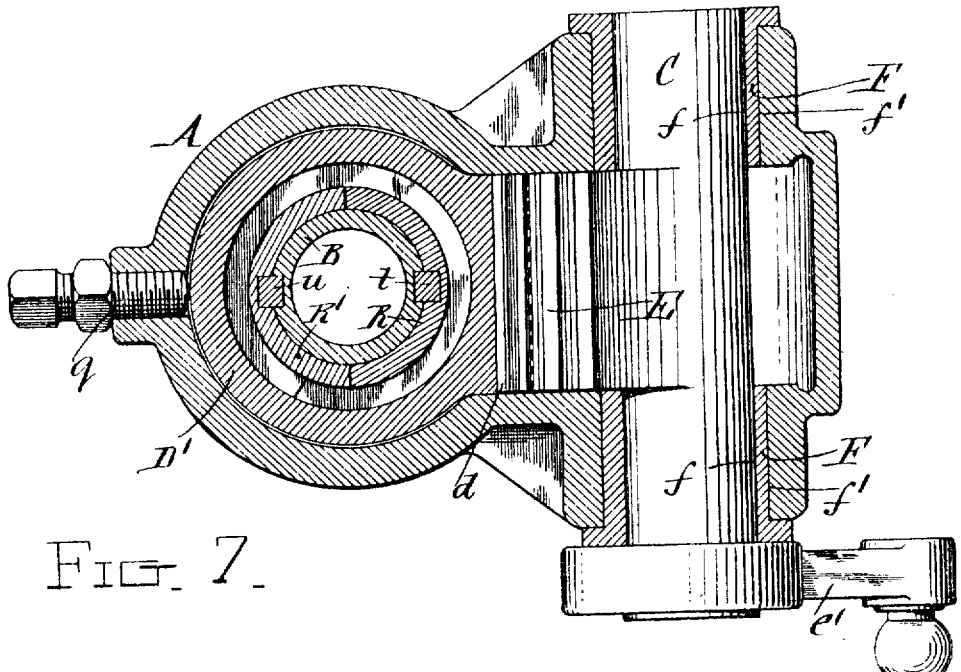
Figure 8:
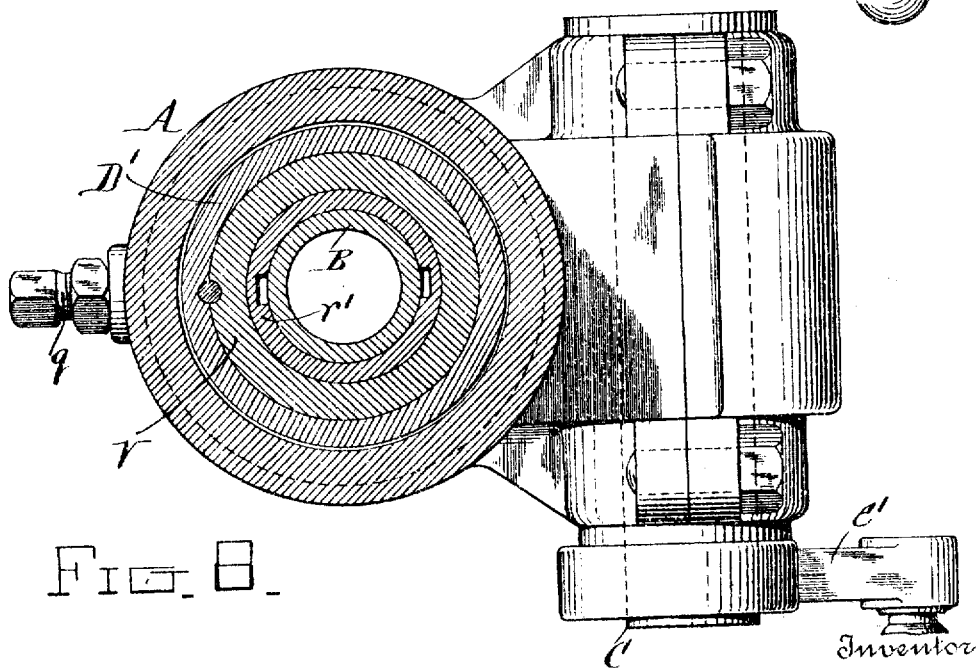

In the accompanying drawings consisting of 4 sheets: Figure 1 is a vertical section of one form of my improved steering gear. Figs. 2 and 3 are horizontal sections of the same in the correspondingly numbered lines in Fig. 1. Fig. 4 is a detached side elevation of the worm or screw. Fig. 5 is a view similar to Fig. 1 showing a modification of my invention. Fig. 6 is a side elevation, on a reduced scale, of the worm shown in Fig. 5. Figs. 7 and 8 are horizontal sections in the correspondingly numbered lines in Fig. 5.

Similar letters of reference indicate corresponding parts throughout the several views.

A represents the inclosing casing or housing of my improved steering gear, B the upright mast, post or column arranged with its lower part in said casing and provided at its upper end with the usual means for turning the same and C the horizontal rock shaft arranged in the casing on one side of the mast and operatively connected with the mast and the steering wheels of the vehicle.

D represents an internally screw threaded sleeve or nut which surrounds the mast within the casing and is capable of sliding vertically therein lengthwise of the mast but prevented from turning with the latter. This sliding movement of the sleeve or nut is transmitted to the rock shaft for operating the latter by means of a gear rack $d$ arranged lengthwise on one side of the sleeve and meshing with a gear segment E on the rock shaft within the casing. The opposite sides of the gear rack engage with the opposite parallel walls $e$ of that part of the casing in which the shaft is arranged, thereby serving as the means whereby the nut or sleeve is held against turning. At one of its ends the rock shaft is provided with a depending arm $e^1$ which may be operatively connected with the steering wheels of the vehicle in any usual and suitable manner. On opposite sides of the segment the rock shaft is journaled in bearings $f$ formed in eccentrics F which turn in circular openings $f^1$ in the adjacent walls of the casing. Upon turning the eccentrics the rock shaft may be moved relatively to the mast for adjusting the segment and rack and taking up any wear between the same. The peripheries $g$, $g^1$ at the upper and lower ends of the screw nut or sleeve are preferably cylindrical and of greater diameter than the central part thereof which carries the gear rack and these end parts engage with corresponding cylindrical guide faces or bores G, G$^1$ on the upper and lower parts of the casing, thereby permitting the ends of the sleeve to be hardened and ground independently of the central part thereof and insuring a good fit of the same in the casing for holding the screw nut or sleeve D and the parts inclosed thereby in a central position relatively to each other.

Between the mast and the screw nut or sleeve is arranged a worm or screw which turns with the mast and has an external screw thread which meshes with the internal thread of the screw sleeve D. This worm is divided lengthwise into a plurality of sections which are arranged circumferentially side by side and which are adjustable lengthwise relatively to each other so as to permit of taking up the slack between the worm and nut due to wear on the coöperating threads of these parts. The sectional worm shown in Figs. 1–4 consists of a cylindrical hub H mounted on the mast and provided on its outerside with a plurality of longitudinal ribs I having external screw thread sections $i$ and a plurality of longitudinal grooves J which alternate with said ribs, and a plurality of longitudinal bars K each of which is slidingly seated in one of the grooves of the worm hub and has external screw thread sections $k^1$. The thread sections of the several bars and ribs register so that together they form a continuous worm which engages with the internal thread of the screw sleeve or nut. The worm thus has two sets of thread sections, one set consisting of the thread sections on the ribs of the hub H and the other set consisting of the thread sections on the bars K. Upon moving the worm hub and bars lengthwise in opposite directions the two sets of worm thread sections are displaced relatively to each other in a direction lengthwise of the axis of the worm whereby one set of thread sections bears against one side of the threads of the screw sleeve or nut while the other set of thread sections bears against the opposite side of the threads of the screw sleeve or nut. By this means it is possible to take up the wear on the threads of the worm and nut and cause the steering wheels to respond promptly to the movement of the mast when the latter is turned by the operator.

As shown in Fig. 1, the lower end of the worm hub bears against the upper end of a lower spacing collar L surrounding the mast. Between the lower end of this collar and the lower end of the casing is arranged a ball bearing comprising a lower ball-race member $l$ engaging with a shoulder on the adjacent part of the casing, an upper ball-race member $l^1$ engaging with the lower end of the worm hub, and an annular row of balls $l^2$ arranged between said ball races.

The lower ends of the worm bars terminate short of the lower end of the worm hub and engage at their upper ends with an upper spacing sleeve M which is separated at its upper end by a ball bearing from an adjusting sleeve N surrounding the mast and screwed into the surrounding upper part of the casing. The last mentioned ball bearing consists of a lower ball-race member $o$ bearing against the upper end of the upper spacing collar, an upper ball-race member $o^1$ bearing against the lower end of the adjusting sleeve and a row of balls $o^2$ arranged between the ball-race members, as shown in Fig. 1. Upon turning the adjusting sleeve N so that it descends in the casing this movement is transmitted successively to the upper ball bearing, upper spacing sleeve and worm bars K whereby the thread sections of the latter are pressed against the upper sides of the threads of the screw nut or sleeve D and during this movement of the adjusting sleeve the hub sections of the worm are held against downward movement owing to the interposition of the lower ball bearing and lower spacing collar between the lower part of the casing and the lower end of the worm hub, whereby the thread sections of the latter are caused to bear against the underside of the threads of the screw sleeve or nut D. The hub section of the worm is thus held practically stationary against downward movement and only moves in this direction under the pressure of the adjusting sleeve N when any wear takes place in the parts which support the worm hub on the lower part of the casing. For this purpose the worm hub is connected with the mast by a spline $p$ which spline may be extended, as shown in Fig. 1, so as to also connect the upper and lower spacing sleeves with the mast and compel these parts to turn with the mast. After adjustment the sleeve N is held in position by a clamping device which preferably consists of a clamping block $n$ engaging the outer side of this sleeve and a clamping screw $n^1$ arranged on the casing and engaging with the clamping block, as shown in Fig. 1.

For the purpose of enabling the operator to readily determine whether there is any play or slack in the worm gearing which requires taking up, means are provided for temporarily holding the screw nut or sleeve D against turning which means preferably consists of a clamping screw $q$ arranged on the casing and adapted to engage with the central part of the screw sleeve or nut D. Upon turning the mast forward and backward when the sleeve D is thus clamped against axial movement, any looseness between the worm and the screw nut D can be readily detected and after the same has been taken up the clamping screw $q$ is again retracted into its inoperative position. If after tightening the adjusting sleeve N there is still a looseness perceptible in the steering gear it is evident that the slack is present between the gear rack and segment which can then be taken up by turning the eccentrics F in the proper direction.

If desired, the worm may be divided lengthwise into two sections R, $R^1$ which are arranged circumferentially side by side and have external thread sections which together form a continuous thread for engaging the screw sleeve or nut $D^1$, as shown in Figs. 5, 6 and 7. One of the two worm sections is provided at its lower end with a collar $r$ which surrounds the mast and rests on a ball bearing S supported by the lower part of the casing and the other worm section is also provided with an upper collar $r^1$ which surrounds the mast and receives the pressure of an adjusting screw sleeve $N^1$ through an interposed ball bearing $S^1$. Upon tightening the adjusting sleeve $N^1$ the worm section $R^1$ is pressed downwardly and caused to engage the underside of its threads with the upper side of the threads of the screw nut $D^1$, while the other worm section R is held against downward movement and caused to press with the upper side of its threads against the underside of the threads of the screw sleeve $D^1$. Inasmuch as the wear of the lower ball bearing is inconsiderable the worm section R may be rigidly secured to the mast by a key $t$ supplemented by a pin or rivet $t^1$, as shown in Figs. 5 and 7. The other worm section R' must, however, be free to move lengthwise of the mast though compelled to turn therewith, this being preferably effected by a spline $u$ between this worm section and the mast, as shown in Figs. 5 and 7. In this modified construction the screw sleeve or nut D' is not centralized on the casing but is held in this position by means of two centering rings V, V' of hardened metal fitting closely around the mast and screwed into the upper and lower ends of the screw sleeve D', as shown in Figs. 5 and 8.

I claim as my invention:

1. A steering gear for vehicles comprising a mast, a worm divided lengthwise into a plurality of sections which are mounted on the mast and are adjustable lengthwise relatively to each other, and a screw nut engaging its internal threads with the external threads of said worm sections.

2. A steering gear for vehicles comprising a mast, a worm divided lengthwise into a plurality of sections which are mounted on the mast and are adjustable lengthwise relatively to each other, a screw nut engaging its internal threads with the external threads of said worm sections, and means for transmitting the movement of said nut to the steering wheels of the vehicle.

3. A steering gear for vehicles comprising a mast, a worm divided lengthwise into a plurality of sections which are mounted on the mast and are adjustable lengthwise relatively to each other, a screw nut engaging its internal threads with the external threads of said worm sections, a casing in which said mast in journaled, a rock shaft journaled in said casing and adapted to be operatively connected with the steering wheels of the vehicle, and means for causing the movement of said nut to rock said shaft.

4. A steering gear for vehicles comprising a mast, an internally threaded screw nut or sleeve, and a worm mounted on said mast and having external threads engaging with the threads of said nut or sleeve and comprising a cylindrical hub provided on its periphery with alternating longitudinal ribs and grooves, said ribs having external screw thread sections, and longitudinal bars arranged in said grooves and having external screw thread sections, and means for adjusting said hub and bars lengthwise relatively to each other.

5. A steering gear for vehicles comprising a mast, an internally threaded screw nut or sleeve, and a worm mounted on said mast and having external threads engaging with the threads of said nut or sleeve and comprising a cylindrical hub provided on its periphery with alternating longitudinal ribs and grooves, said ribs having external screw thread sections, and longitudinal bars arranged in said grooves and having external screw thread sections, a casing inclosing said worm and screw sleeve and supporting said hub, and adjusting means mounted on the casing and operating on said bars.

6. A steering gear for vehicles comprising a mast, an internally threaded screw nut or sleeve, and a worm mounted on said mast and having external threads engaging with the threads of said nut or sleeve and comprising a cylindrical hub provided on its periphery with alternating longitudinal ribs and grooves, said ribs having external screw thread sections, and longitudinal bars arranged in said grooves and having external screw thread sections, a casing inclosing said worm and screw sleeve and supporting one end of said hub, and adjusting means mounted on said casing and operating on the opposite ends of said bars.

7. A steering gear for vehicles comprising a mast, an internally threaded screw nut or sleeve, and a worm mounted on said mast and having external threads engaging with the threads of said nut or sleeve and comprising a cylindrical hub provided on its periphery with alternating longitudinal ribs and grooves, said ribs having external screw thread sections, and longitudinal bars arranged in said grooves and having external screw thread sections, means for adjusting said hub and bars lengthwise relatively to each other, and means for transmitting the movement of said sleeve to the steering wheels of the vehicle.

8. A steering gear for vehicles comprising a mast, an internally threaded screw nut or sleeve, and a worm mounted on said mast and having external threads engaging with the threads of said nut or sleeve and comprising a cylindrical hub provided on its periphery with alternating longitudinal ribs and grooves, said ribs having external screw thread sections, and longitudinal bars arranged in said grooves and having external screw thread sections, means for causing said hub to turn with said mast, an inclosing casing, two collars surrounding the mast and one engaging with one end of said hub while the other engages with the opposite ends of said bars, a ball bearing interposed between the casing and the collar which engages with said hub, an adjusting screw sleeve engaging with the casing and surrounding the mast, and a ball bearing interposed between said adjusting sleeve and said collar which engages with said bars.

9. A steering gear for vehicles comprising a mast, an externally threaded worm having sections which are adjustable lengthwise relatively to each other on the mast, a screw sleeve or nut having internal threads which are engaged by the threads of said worm sections, and means for holding said screw sleeve against longitudinal movement.

10. A steering gear for vehicles comprising a mast, an externally threaded worm having sections which are adjustable lengthwise relatively to each other on the mast, a screw sleeve or nut having internal threads which are engaged by the threads of said worm sections, a casing inclosing said worm and screw sleeve, and a clamping screw arranged on said casing adapted to engage said screw sleeve for holding the same against longitudinal movement.

11. A steering gear for vehicles comprising a mast, an externally threaded worm having sections which are adjustable lengthwise relatively to each other on the mast, a screw sleeve or nut having internal threads which are engaged by the threads of said worm sections, and a casing having internal cylindrical guide faces which are engaged by enlarged cylindrical peripheries at opposite ends of the screw sleeve.

Witness my hand this 4th day of May, 1909.

JOHN A. WILSON, Jr.

Witnesses:
    THEO. L. POPP,
    ANNA HEIGIS.